United States Patent
Elend et al.

(10) Patent No.: US 12,494,939 B2
(45) Date of Patent: Dec. 9, 2025

(54) APPARATUS FOR A CONTROLLER AREA NETWORK

(71) Applicant: NXP B.V., Eindhoven (NL)

(72) Inventors: Bernd Uwe Gerhard Elend, Hamburg (DE); Rolf van de Burgt, Laag Zuthem (NL); Thierry G. C. Walrant, Bouge (BE)

(73) Assignee: NXP B.V., Eindhoven (NL)

( * ) Notice: Subject to any disclaimer, the term of this patent is extended or adjusted under 35 U.S.C. 154(b) by 300 days.

(21) Appl. No.: 18/061,858

(22) Filed: Dec. 5, 2022

(65) Prior Publication Data

US 2023/0198800 A1  Jun. 22, 2023

(30) Foreign Application Priority Data

Dec. 17, 2021  (EP) .................................... 21215665

(51) Int. Cl.
 *H04L 12/40* (2006.01)
(52) U.S. Cl.
 CPC .. *H04L 12/40013* (2013.01); *H04L 12/40078* (2013.01); *H04L 2012/40215* (2013.01)
(58) Field of Classification Search
 CPC ............... H04L 12/40; H04L 12/40013; H04L 12/40032; H04L 12/40078; H04L 2012/40215; H04L 2012/40273; H04L 1/00; H04B 1/40
 See application file for complete search history.

(56) References Cited

U.S. PATENT DOCUMENTS

| 9,471,528 B2 * | 10/2016 | Muth ................... G06F 13/4072 |
| 10,009,289 B2 * | 6/2018 | Maise ...................... H04L 12/40 |
| 10,277,385 B1 * | 4/2019 | Anandan ................. H04L 7/041 |

(Continued)

FOREIGN PATENT DOCUMENTS

| DE | 102018219292 A1 | 5/2020 |
| EP | 3809638 A1 | 4/2021 |
| WO | WO-2015011515 A1 | 1/2015 |

OTHER PUBLICATIONS

"Hiroto Ogura et al., Electrical Falsification of CAN Data by Magnetic Coupling, Jul. 6, 2020, ITC-CSCC, Nagoya (Online Conference), pp. 348-353" (Year: 2020).*

(Continued)

*Primary Examiner* — Rasheed Gidado

(57) ABSTRACT

An apparatus for a controller area network, CAN, node, the node comprising a CAN controller and a CAN transceiver that is configured to couple to a CAN bus, the apparatus comprising a CAN protocol decoder and circuitry, the apparatus configured to:
 receive an RX-bitstream generated by the CAN transceiver for the CAN controller;
 receive a TX-bitstream generated by the CAN controller for receipt by the CAN transceiver;
wherein the CAN protocol decoder is configured to receive a bitstream based on the TX-bitstream for decoding CAN frames therein for monitoring of the CAN controller; and
wherein the circuitry is configured to:
 detect an idle state;
 based on the detection of the idle state, modify the bitstream received by the CAN protocol decoder such that it includes a Start-of-Frame bit further based on detection of a Start-of-frame bit in the RX-bitstream.

20 Claims, 3 Drawing Sheets

(56) References Cited

U.S. PATENT DOCUMENTS

| | | |
|---|---|---|
| 10,361,934 B2 | 7/2019 | Elend et al. |
| 11,595,412 B2* | 2/2023 | Antonsson .......... H04L 63/1425 |
| 2008/0073564 A1 | 3/2008 | Mun |
| 2015/0095532 A1* | 4/2015 | Muth ........................ G06F 3/00 |
| | | 710/105 |
| 2015/0095711 A1* | 4/2015 | Elend .................. H04L 12/4135 |
| | | 714/39 |
| 2021/0374083 A1* | 12/2021 | de Haas .................. G06F 13/20 |
| 2021/0399919 A1 | 12/2021 | Mutter et al. |

OTHER PUBLICATIONS

NXP; "NXP TJA115x Secure CAN Transceiver Family"; Product Sheet; retrieved from the Internet https://www.nxp.com/docs/en/fact-sheet/SECURCANTRLFUS.pdf; 2 pages (Nov. 30, 2022).

* cited by examiner

APPARATUS FOR A CONTROLLER AREA NETWORK

CROSS-REFERENCE TO RELATED APPLICATIONS

This application claims the priority under 35 U.S.C. § 119 of European patent application no. 21215665.7, filed Dec. 17, 2021 the contents of which are incorporated by reference herein.

FIELD

The present disclosure relates to an apparatus for use with a controller area network (CAN) node. It also relates to a method of operating an apparatus that is coupled with the CAN node.

BACKGROUND

In-vehicle network (IVN) buses, such as CAN (Controller Area Network), CAN FD (CAN with Flexible Data-Rate), LIN (Local Interconnect Network), FlexRay, Ethernet based network buses, and other types, can be used for communications within vehicles. For example, a controller area network (CAN) bus is a message-based communications bus protocol that is often used within automobiles. It will be appreciated that CAN networks also have application outside of the field of automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The CAN bus protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-1:2015 standard, can provide higher data rates. The standardized CAN data link layer protocol is being further extended to provide even higher data rates. A further extension, referred to as CAN XL, with a new level scheme allowing even higher data rates is in the definition phase discussed under CiA610 (CAN in Automation) and is moving towards standardization in the form of either a further update of the existing ISO11898 standards or a new standard.

SUMMARY

According to a first aspect of the present disclosure there is provided an apparatus for a controller area network, CAN, node, the node comprising a CAN controller and a CAN transceiver that is configured to couple to a CAN bus, the apparatus comprising a CAN protocol decoder and circuitry, the apparatus configured to:
  receive an RX-bitstream comprising a bitstream generated from signalling received from the CAN bus by the CAN transceiver for the CAN controller;
  receive a TX-bitstream comprising a bitstream generated by the CAN controller for receipt by the CAN transceiver for transmission of signalling on the CAN bus;
  wherein the CAN protocol decoder is configured to receive a bitstream based on the TX-bitstream for decoding CAN frames therein for monitoring of the CAN controller;
and wherein the circuitry is configured to:
  detect an idle state that occurs between CAN frames based on at least one of the RX-bitstream and the TX-bitstream;
  based on the detection of the idle state, modify the bitstream received by the CAN protocol decoder such that it includes a Start-of-Frame bit further based on detection of a Start-of-frame bit in the RX-bitstream.

In one or more examples, said modification of the bitstream received by the CAN protocol decoder is provided by the circuitry at least at times when the Start-of-Frame bit is absent in the TX-bitstream.

In one or more embodiments, the circuitry is configured to, based on the detection of the idle state, switch from providing the CAN protocol decoder the TX-bitstream for decoding to providing the CAN protocol decoder with a combination of the RX-bitstream and the TX-bitstream for decoding.

In one or more embodiments, the circuitry is configured to, based on the detection of the idle state, switch from providing the CAN protocol decoder the TX-bitstream for decoding to providing the CAN protocol decoder with the RX-bitstream rather than the TX-bitstream.

In one or more embodiments, the circuitry is configured to, based on detection of a dominant bit in said combination of the RX-bitstream and the TX-bitstream, switch to providing the CAN protocol decoder with the TX-bitstream for decoding.

In one or more embodiments, said circuitry is configured to determine the occurrence of the idle state based on detection of six or more consecutive recessive bits in both the TX-bitstream and the RX-bitstream.

In one or more embodiments, said apparatus includes a compliance module configured to receive the decoded CAN frame from the CAN protocol decoder, the compliance module configured to determine whether the decoded CAN frame derived from at least the TX-bitstream is compliant with a rule-set based on the CAN protocol and if the CAN frames are non-compliant, generate an error signal.

In one or more examples, the rule-set based on the CAN protocol includes one or more specifications of ISO standard 11898-1.

In one or more embodiments, said CAN protocol decoder comprises a first CAN protocol decoder for decoding CAN frames received, at least in part, in said TX-bitstream, and wherein the apparatus comprises a second CAN protocol decoder configured to decode CAN frames received in said RX-bitstream, or the CAN protocol decoder is for decoding a combination of the TX-bitstream and RX-bitstream, wherein the apparatus includes a compliance module configured to compare at least parts of the decoded CAN frames from the first CAN protocol decoder with at least parts of the decoded CAN frames from the second CAN protocol decoder and determine a compliance status of said CAN controller based on a predetermined rule-set and said comparison and if the CAN controller is non-compliant, generate an error signal.

In one or more embodiments, the circuitry is configured to:
  detect a CRC delimiter bit based on the RX-bitstream and the TX-bitstream;
  based on the detection of the CRC delimiter bit modify the bitstream received by the CAN protocol decoder such that it includes an ACK acknowledgement bit based on detection of an ACK acknowledgement bit in the RX-bitstream at least at times when the ACK acknowledgement bit is absent in the TX-bitstream.

In one or more embodiments, the circuitry is configured to:
detect a falling edge based on the RX-bitstream, the falling edge for use in time synchronisation; and
based on the detection of the falling edge, modify the bitstream received by the CAN protocol decoder such that it includes a falling edge at a time corresponding to the time of the detected falling edge in the RX-bitstream, at least at times during an arbitration time.

In one or more embodiments, said circuitry comprises:
a logic OR configured to receive the RX-bitstream at a first input and an allow-SOF-recreation signal at a second input, the allow-SOF-recreation signal configured to be logic low based on said detection of the idle state;
a logic AND configured to receive the TX-bitstream at a first input and an output of the logic OR at a second input; and
wherein said bitstream received by the CAN protocol decoder comprises an output of said logic AND.

In one or more examples, said apparatus is configured to provide a logic high allow-SOF-recreation signal based on said detection of a dominant bit in a combination of the RX-bitstream and the TX-bitstream at least until detection of a subsequent idle state.

It will be appreciated that other events may trigger the apparatus to provide the allow-SOF-recreation signal logic low prior to the detection of the subsequent idle state.

In one or more embodiments, said apparatus comprises part of the CAN transceiver.

In one or more examples, the circuitry comprises a bit generator for generating a bit in a bitstream and wherein the bit generator is configured to provide a logic zero start-of-frame bit in the TX-bitstream based on the occurrence of a logic zero start-of-frame bit in the RX-bitstream.

In one or more embodiments, said apparatus is configured to provide for invalidation of a current CAN frame based on said generation of the error signal.

In one or more embodiments, said CAN protocol decoder is configured to operate in accordance with specifications of ISO standard 11898-1.

According to a second aspect of the present disclosure there is provided a method for a controller area network, CAN, node comprising a CAN controller and a CAN transceiver that is configured to couple to a CAN bus, the method comprising:
receiving an RX-bitstream comprising a bitstream generated from signalling received from a CAN bus by the CAN transceiver for the CAN controller;
receiving a TX-bitstream comprising a bitstream generated by the CAN controller for receipt by the CAN transceiver for transmission of signalling on the CAN bus;
receiving, by a CAN protocol decoder, a bitstream based on the TX-bitstream for decoding CAN frames therein for monitoring of the CAN controller;
detecting, by circuitry, an idle state that occurs between CAN frames based on the RX-bitstream and the TX-bitstream; and
based on the detection of the idle state, modifying the bitstream received by the CAN protocol decoder such that it includes a Start-of-Frame bit based on detection of a Start-of-frame bit in the RX-bitstream.

According to a third aspect of the present disclosure there is provided a computer program or computer program product comprising computer program code which is configured to cause a processor and a memory to perform the method of the second aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
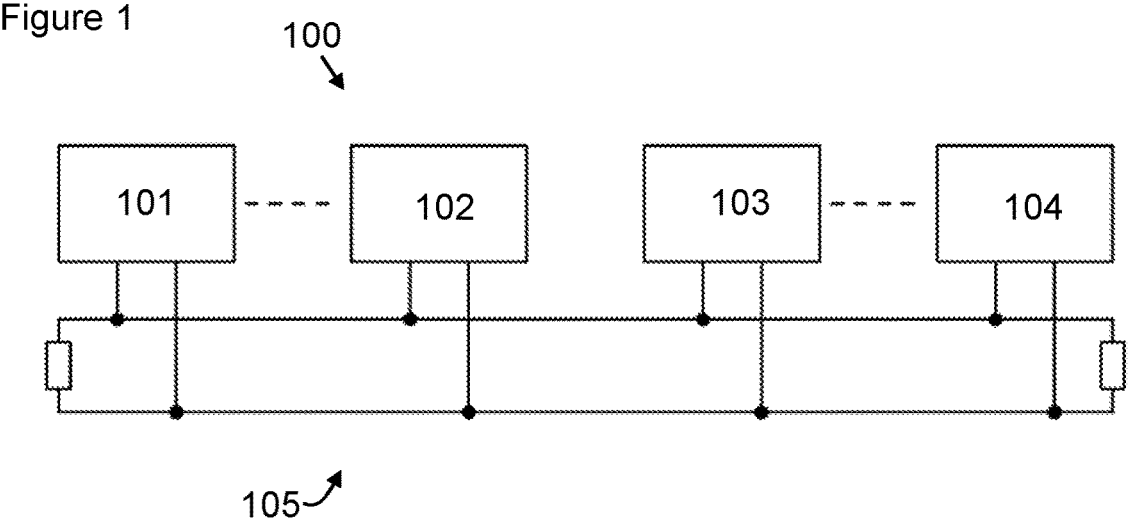
FIG. 1 shows an example embodiment of a plurality of CAN nodes connected to a common CAN bus.

Example FIG. 1 shows a CAN bus system 100 with a plurality of nodes or ECUs (Electronic Control Units) 101-104 connected to the same CAN bus wires 105 comprising a first CANH wire and a second CANL wire. The nodes 101-104 may comprise nodes that implement Classical CAN, CAN FD nodes that implement the CAN FD protocol or CAN XL nodes that implement the new CAN XL protocol.

Figure 2:
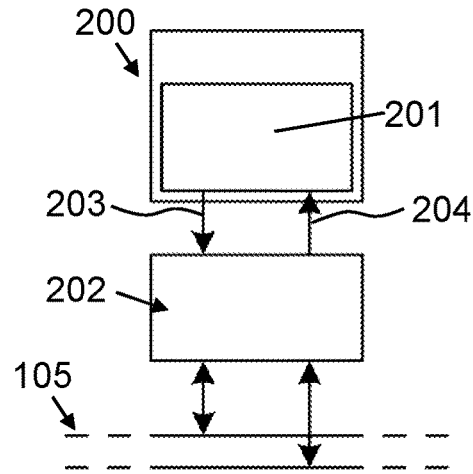
FIG. 2 shows an example CAN node comprising a CAN controller coupled with a CAN transceiver, the CAN transceiver providing the coupling to the CAN bus.

Example FIG. 2 shows one of the nodes 101-104 in more detail. A node mainly comprises a CAN controller 200, such as a microcontroller, that implements the CAN, CAN FD or CAN XL protocol such as by using an embedded CAN, CAN FD or CAN XL protocol controller 201. The controller 200 and, more particularly, the protocol controller 201 is connected to the CAN bus 105 by a CAN transceiver 202. The CAN controller 200 is connected to the CAN transceiver 202 through two interface connections called TXD (Transmit Data) line 203 and RXD (Receive Data) line 204. The CAN controller 200 may therefore have a transmit output terminal that couples with a transmit input terminal of the CAN transceiver 202. Likewise, the CAN transceiver 202 may have a receive output terminal that couples with a receive input terminal of the CAN controller 200. The CAN transceiver 202 is used to convert transmit data comprising digital stream of bits or "TX-bitstream" on TXD 203 into analogue signalling on the bus wires 105. The transceiver 202 may also be used to convert analogue signalling from the bus 105 into receive data comprising a digital output signal or RX-bitstream for providing to the RXD connection 204. In general, the CAN transceiver comprises an interface device to the network and the CAN controller comprises a controller that is configured to transmit data to and receive data from the network via the interface device.

The nature of the CAN bus 105 is that recessive bits can be overwritten on the physical medium by dominant bits. This is an intended behavior to allow for non-destructive arbitration and guarantees an efficient mechanism for multiple nodes to access the same bus 105. Further, the signal on the CAN bus 105 is always the results of the signals concurrently send by all nodes 101-104 plus any distortions that may be created by energy that was absorbed by the wire harness or reflected at points in the bus 105.

It may be advantageous to observe or monitor a CAN node, such as for safety or security reasons. A problem that may arise in some examples is that an observer that is placed close to a transmitting node 101-104 and decoding only the signalling on the CAN bus 105 is not able to unambiguously determine the contribution to the signalling on the bus 105 that transmitting node makes. If the observer is tasked with monitoring the behaviour of said transmitting node, this makes observations difficult.

For example, if the sending node intends to send a Classical CAN frame with extended identifier, but due to distortions on the bus 105 the observer samples an IDE or a FDF bit, which both were sent recessive, as dominant and it will thus decide the wrong frame format is used. As consequence the observer could conclude shortly after, erroneously, that the sender is violating the CAN specification. One solution is to give the observer access to the transmitting nodes output bitstream (TXD) 203.

Figure 3:
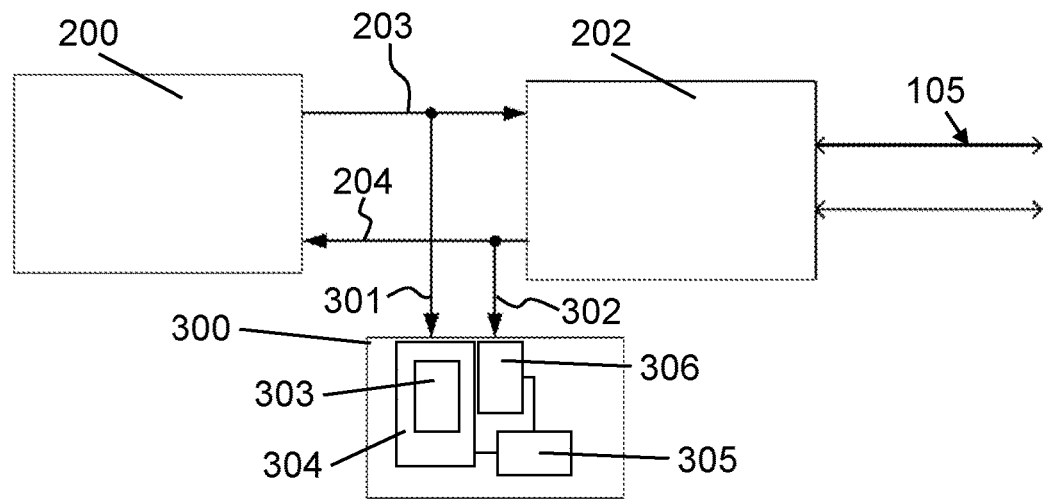
FIG. 3 shows an example embodiment comprising an apparatus arranged with a CAN transceiver and a CAN controller.

FIG. 3 shows an example apparatus 300 of the disclosure. FIG. 3 also shows the CAN controller 200 (including the protocol controller 201 which is not shown in FIG. 3) and the CAN transceiver 202 of FIG. 2. The apparatus 300 is configured to monitor the one or more signals provided for transmission between a CAN controller 200 and a CAN transceiver 202. A first connection 301 couples the apparatus 300 to the TxD line 203 between the CAN controller 200 and the CAN transceiver 202. Accordingly, the apparatus 300 can receive the TX-bitstream. A second connection 302 couples the apparatus 300 to the RxD line 204 between the CAN transceiver 202 and the CAN controller 200. Accordingly, the apparatus 300 can receive the RX-bitstream.

The apparatus 300 may be configured to monitor at least the TX-bitstream to determine a status of the CAN controller 200. Accordingly, the apparatus 300 includes a CAN protocol decoder 303 configured to decode CAN frames from the TX-bitstream. It will be appreciated that the process of decoding CAN frames is intended to include identifying the occurrence of CAN frames within the TX-bitstream and determining the value of one or more fields within the CAN frame. With this information, the apparatus 300 may be configured to determine whether the CAN frame provided from the CAN controller 200 is conformant with one or more rules, such as CAN protocol rules.

In FIG. 3, the apparatus 300 is shown separate from the CAN controller 200 and separate from the CAN transceiver 202. However, in other examples, the apparatus 300 may be part of the CAN transceiver 202 or part of an interface through which the CAN controller 200 connects with the CAN transceiver 202, thereby having access to the TXD and RxD lines 203, 204. In FIG. 3, the connection to receive the RX-bitstream and TX-bitstream is shown part way along the lines 203 and 204. However, the connection 301 may be made at the transmit output terminal of the CAN controller 200 or the transmit input terminal of the CAN transceiver 202. Likewise the connection 302 may be made at the receive output terminal of the CAN transceiver 202 or the receive input terminal of the CAN controller 200. In general, however, the connections 301 and 302 may be made external of the CAN controller 200 or CAN transceiver 202 or internal of the CAN controller 200 or CAN transceiver 202. Thus, in one or more general examples, the apparatus 300 is thus configured to receive signalling that is indicative of the TX-bitstream to enable it to appreciate what the CAN controller is transmitting. Further, in one or more examples, the apparatus 300 is thus configured to receive signalling that is indicative of the RX-bitstream to enable it to appreciate what the CAN controller is receiving from the bus 105.

Figure 4:
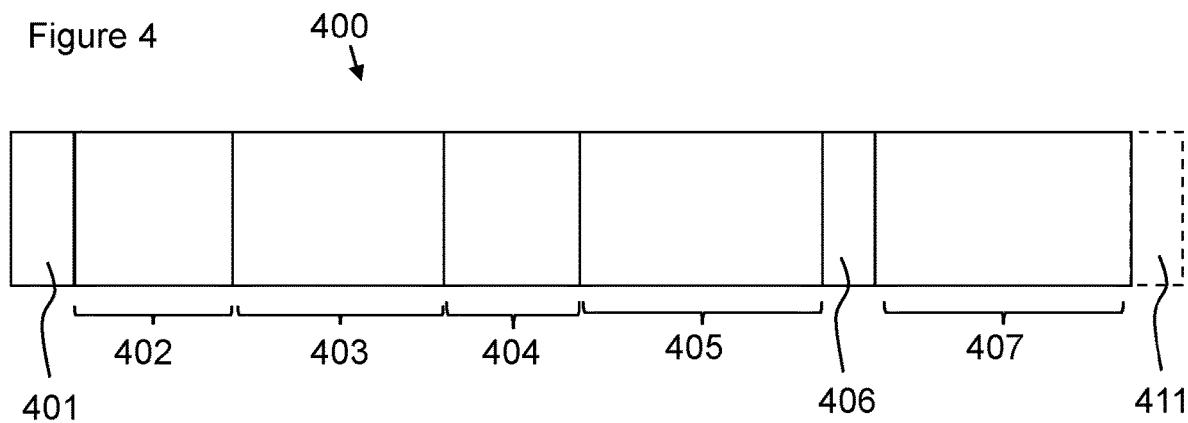
FIG. 4 shows an example CAN frame.

FIG. 4 shows a typical CAN frame 400. The frame comprises a Start-of-Frame field 401 which designates the start of a CAN frame 400. An arbitration field 402 follows the Start-of-Frame field 401 in which it is determined which node 101-104 wins access to the bus 105. Following the arbitration field 402, the frame comprises a field of control bits 403, including IDE, FDF and res, which can be used for signalling the type of CAN protocol that will follow. A data field 404 follows the control bits field 403, which contains the data content of the frame. A CRC field 405 follows the data field 404, which contains error detection and/or error correction information. An acknowledgement field 406 follows. An inter-frame space 407 including End-of-frame bits is provided to provide an identifiable separation between different frames. The bus (and therefore the nodes) may be considered idle in this inter-frame space 407. A subsequent frame may then begin with the Start-of-Frame field which is numbered as 411 to distinguish it from the corresponding Start-of-Frame field 401 of the subsequent frame 400.

A CAN protocol decoder 303 that may operate in accordance with ISO11898-1 may have problems decoding CAN frames based on the TX-bitstream. For example, a CAN frame in the TX-bitstream might be aborted when the CAN controller 200 determines that arbitration has been lost, or a Start-of-frame bit 401, 411 may be omitted if a remote node starts sending a frame early while the local node (to which the apparatus 300 is coupled) has a transmission pending or the Start-of-frame bit is incomplete when the CAN controller 200 synchronizes on a falling edge in the moment it wants to start to transmit its own Start-of-frame bit. Also, the ACK bit 406 given at the end of a successful reception of a frame needs to be handled in an appropriate way. Further there are scenarios where the CAN controller 200 needs to send an active error message during reception or its own transmission. Thus, monitoring the TX-bitstream may not be straightforward for the CAN protocol decoder 303 because the CAN controller 200 may be operating correctly but reacting to the real-world conditions on the bus 105, which can make identifying the start-of-frame bit 401, 411 among other bits difficult for the CAN protocol decoder 303. If the CAN protocol decoder cannot determine the start-of-frame bit for example, it makes identification of other bits in the frame difficult and may impact on synchronization.

The apparatus 300 of the embodiment of FIG. 3 comprises circuitry 304 that is configured to detect an idle state that occurs between CAN frames based on the RX-bitstream and/or the TX-bitstream. The idle state may be identified by detecting the series of consecutive bits in inter-frame space 407. It will be appreciated that presence of the inter-frame space 407 is indicative that the next start-of-frame bit 411 will be appearing on the bus and/or in the TX-bitstream. In one or more examples, the circuitry 304 may be configured to determine the occurrence of the idle state based on detection of six or more consecutive recessive bits in both the TX-bitstream and the RX-bitstream or only the RX-bitstream. Determining the occurrence of the idle state based on the TX-bitstream and the RX-bitstream may be advantageous because if the CAN controller did not win arbitration, then consecutive recessive bits may be present in the TX-bitstream but they may not be indicative of an interframe space 407.

The apparatus 300 of one or more examples is configured to ensure that the bitstream received by the CAN protocol decoder 303 includes a start-of-frame bit 401, 411 even though the TX-bitstream may, in some circumstances, not include or only partially include a start-of-frame bit 401, 411. Thus, the circuitry 304 may be configured to act or be ready to act based on the detection of the idle state and then it may be configured to modify the bitstream received by the CAN protocol decoder 303 such that it includes a start-of-frame bit 401, 411 based on detection of a start-of-frame bit in the RX-bitstream. Thus, the circuitry 403 may use the time of the receipt of the start-of-frame bit 401, 411 from the bus 105 and as seen in the RX-bitstream to provide said modification of the bitstream received by the CAN protocol decoder 303 such that the start-of-frame bit appears (from the point of view of the CAN protocol decoder 303) to be present in the TX-bitstream at an appropriate time. This functionality may be provided at all times but at least at times when the start-of-frame bit is absent in the TX-bitstream received on connection 301. Thus, in some examples, the circuitry 304 may selectively modify the bitstream received by the CAN protocol decoder 303 based on the absence of the start-of-frame bit in the TX-bitstream, or, alternatively the circuitry 304 may be configured to act in response to every idle state to ensure the start-of-frame bit 401, 411 is present, whether in the TX-bitstream or to generate it.

Thus, as mentioned above, the CAN protocol decoder 303 is configured to receive a bitstream based on the TX-bitstream and in some examples, this may be the TX-bitstream. However, the circuitry 304 may be configured to modify the TX-bitstream at certain times or provide an alternative bitstream at certain times to the CAN protocol decoder 303 to ensure the CAN protocol decoder 303 receives a bitstream that includes the start-of-frame bit 401, 411 and can therefore decode the CAN frame more reliably. Thus, the action of the circuitry 304 in modifying the bitstream received by the CAN protocol decoder can include modification of the TX-bitstream (such as by a bit generator) to include the start-of-frame bit or temporarily changing the input to the CAN protocol decoder 303 from TX-bitstream to a different bitstream that includes a start-of-frame bit 401, 411 at an appropriate time.

In the present example and one or more other examples, the circuitry 304 is configured to, based on the detection of the idle state, switch from providing the CAN protocol decoder 303 the TX-bitstream for decoding to providing the CAN protocol decoder 303 a bitstream based on a combination of the RX-bitstream and the TX-bitstream for decoding. Thus, the combination of the RX-bitstream and the TX-bitstream will include a start-of-frame bit whether that be from the TX-bitstream or the RX-bitstream.

Once the bitstream received by the CAN protocol decoder 303 has been modified to include the start-of-frame bit 401, 411, then the circuitry can stop modifying the bitstream and the CAN protocol decoder 303 can return to receiving the unmodified TX-bitstream. Thus, the circuitry 304 may be configured to detect a dominant bit, that is a logic 0, in said combination of the RX-bitstream and the TX-bitstream. The dominant bit is the start-of-frame bit 401, 411 which occurs after the recessive bits, that is logic 1 bits, of the interframe space 407. When the circuitry 304 detects the start-of-frame bit it may be configured to switch back to providing the CAN protocol decoder 303 with the TX-bitstream for decoding, such as in an unmodified form.

The purpose of the apparatus 300 may be to provide security or safety features for a CAN node 101-104. Thus, the apparatus 300 may be configured to decode the CAN frames 400 in the TX-bitstream so that it can evaluate the form, such as in terms of the bit content of the various fields, of the CAN frames transmitted by the CAN controller 200. Accordingly, the apparatus 300 may be configured to detect whether or not the CAN controller 200 is acting normally and in accordance with the CAN protocol or abnormally which may suggest the CAN controller 200 is faulty or has been maliciously compromised.

Thus, the apparatus 300 may include a compliance module 305 configured to receive the decoded CAN frame from the CAN protocol decoder 303. The compliance module 305 may be configured to determine whether the CAN frames decoded by the CAN protocol decoder 303 are compliant with a rule-set based on the CAN protocol and, if the CAN frames are non-compliant, generate an error signal. Thus, the rule-set may include one or more frame format rules of the CAN protocol specification as defined in ISO standard 11898-1. In one or more other examples, the rule-set may include application specific rules on data content in the data field 404. However, in general, it will be appreciated that the rule-set may define any number of requirements for any part of the CAN frame 400 including its bit content and/or timing of the bits therein.

The compliance module 305 may be configured to examine a CAN frame from the CAN protocol decoder 303 in isolation against the rule-set. In other examples, the examination of compliance may include comparing the content and/or timing of the CAN frame generated by the CAN controller 200 based on one or more signals on the CAN bus 105. Accordingly, in one or more examples, said CAN protocol decoder 303 may be termed a first CAN protocol decoder 303 for decoding CAN frames received, at least in part, in said TX-bitstream (e.g. it may decode a combination of the RX-bitstream and the TX-bitstream) and wherein the apparatus 300 comprises a second CAN protocol decoder 306 configured to decode CAN frames received, at least in part, in said RX-bitstream from connection 302 (e.g. it may decode a different combination of the RX-bitstream and the TX-bitstream). In this example, the compliance module 305 may be configured to compare the decoded CAN frames from the first CAN protocol decoder 303 with the decoded CAN frames from the second CAN protocol decoder 306 and/or activity received from the CAN bus 105. Based on that comparison, the compliance module 305 may be configured to determine a compliance status of said CAN controller 200 based on a predetermined rule-set and if the CAN controller is non-compliant, generate an error signal. The error signal may prompt further action by the apparatus or a different entity.

In either case, the generation of the error signal be configured to cause the node 101-104 to generate an error frame (or other signalling that will indicate an error), shutdown, or a supervising node may be informed or the CAN controller 200 may be temporarily blocked from transmitting or any other appropriate action.

In one or more examples, the compliance module 305 may be configured to derive information about the intended frame format transmitted by the CAN controller 200 by reading one or more of the bits in the RTR, IDE, BRS, FDF and res bit positions (and XLF bit position for a CAN XL frame). The compliance module 305 may then determine whether or not the frame format is compliant with the intended frame format.

In one or more examples, the compliance module 305 may be configured to derive information about whether arbitration was won or lost or is yet undecided by comparing ID bits decoded by the first CAN protocol decoder 305 and the second CAN protocol decoder 306. The compliance module 305 may then determine whether the CAN controller 200 is transmitting only when it has won access to the bus 105.

In one or more examples, the compliance module 305 may be configured to compare the decoded CAN frames received from the first and second CAN protocol decoders 303,306 only up to a bit position that has currently been sampled by both decoders and before an end of a field in the event there is a difference between the RX-bitstream and the TX-bitstream. For example, if the compliance module 305 determines a difference in the frame format information read from IDE and/or FDF bit positions, then an error signal may be generated without reading the remainder of the frame or field.

In one or more examples, the compliance module may be configured to determine if a transmission in the TX-bitstream is compliant with ISO11898-1 by checking when and/or if the CAN protocol decoder 303 advances from one state to a next state.

In one or more examples, the compliance module 305 may be configured to determine if transmission in the TX-bitstream is compliant with ISO11898-1 by checking when and/or if the CAN protocol decoder 303 advances from one state to a next state based on an advancement of a state of the second CAN protocol decoder 306.

In the present and one or more examples, the apparatus 300 is configured to mitigate against the CAN protocol decoder 303 that decodes the TX-bitstream not receiving a start-of-frame bit. However, in other examples, the apparatus may be configured to mitigate against the CAN protocol decoder 303 that decodes the TX-bitstream not receiving other bits in the frame, such as the ACK bit 406.

In such an example, the circuitry 306 is configured to detect a CRC delimiter bit based on the RX-bitstream and the TX-bitstream; and based on the detection of the CRC delimiter bit, modify the bitstream received by the CAN protocol decoder such that it includes an ACK acknowledgement bit. The apparatus may monitor the RX-bitstream to determine when the ACK acknowledgement bit should be present. Thus, the modification of the bitstream received by the CAN protocol decoder 303 may be based on detection of an ACK acknowledgement bit in the RX-bitstream and performed at least at times when the ACK acknowledgement bit is absent in the TX-bitstream.

In the present and one or more examples, the apparatus 300 is configured to mitigate against the CAN protocol decoder 303 that decodes a bitstream based on the TX-bitstream not receiving a start-of-frame bit. However, in other examples, the apparatus may be configured to mitigate against the CAN protocol decoder 303 that decodes the TX-bitstream not receiving other bits or synchronization bits/events in the frame. Such non receipt of said bits/events may be caused by glitches that may occur due to distortions on the CAN bus, or by other nodes joining the arbitration process. This "mitigation" may not be active throughout the entire frame, but only active during certain parts of the frame; e.g. only in the arbitration field.

Thus, based on determination of one or more bits or synchronization events in the TX-bitstream that are absent and wherein said one or more bits are present in the RX-bitstream, the circuitry may be configured to modify the bitstream to be received by the CAN protocol decoder 303 such that it includes those one or more bits/events determined as absent. Synchronization bits/events are used by the CAN protocol decoder 303 for time synchronization with the signalling from the CAN bus.

Figure 5:
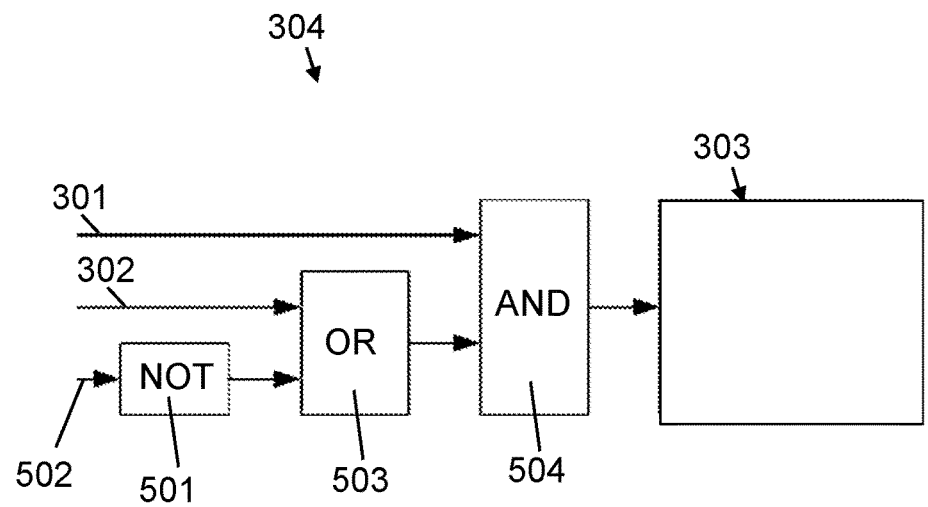
FIG. 5 shows an example embodiment of the apparatus of FIG. 3 in the form of a plurality of logic elements.

The apparatus 300 including one or more of the first CAN protocol decoder 303, the second CAN protocol decoder 306, the compliance module 305 and the circuitry 304 may be embodied as functions of a processor, microcontroller, FPGA or PLC. However, FIG. 5 shows one example of an embodiment of the circuitry 304, which may be provided by a plurality of logic circuits or a programmable logic controller.

In this example, the circuitry 304 comprises a logic NOT 501 configured to receive an "allow-SOF-recreation" signal 502. The allow-SOF-recreation signal comprises a signal that indicates to the circuitry 304 that it should make or facilitate the making of the modification of the bitstream received by the CAN protocol decoder 303 to create the start-of-frame bit. The logic NOT 501 simply inverts the logic signal at its input.

In this example, when the allow-SOF-recreation signal is logic high or "one", the circuitry provides the modification of the bitstream. That is when the logic NOT 501 outputs a logic low. When the allow-SOF-recreation signal is logic low or "zero", the circuitry 304 does not provide the modification of the bitstream. That is when the logic NOT 501 outputs a logic high. It will be appreciated that the NOT gate 501 is not essential because the remainder of the circuitry described below could equally be configured to provide the modification on a logic low and not make it on logic high. In general, there are many different ways in which the skilled person may implement the modification of the TX-bitstream as described herein.

Nevertheless, the circuitry 304 may further comprise a logic OR 503 configured to receive the RX-bitstream at a first input and the (inverted) allow-SOF-recreation signal at a second input.

In this example, the allow-SOF-recreation signal is configured to be logic high based on said detection of the idle state. Thus, detection of the idle state caused by the interframe space 407 causes the apparatus 300 to set the allow-SOF-recreation signal to logic high, which is inverted to logic low in this embodiment by the logic NOT 501. The circuitry 304 is thus ready to make the modification to the bitstream received by the CAN protocol decoder 303.

The circuitry 304 further comprises a logic AND 504 configured to receive the TX-bitstream at a first input and the output of the logic OR 503 at a second input. The bitstream received by the CAN protocol decoder 303 comprises an output of said logic AND 504.

Thus, if the allow-SOF-recreation is logic zero, the input at the second input to the logic OR 503 is logic one. The input at the first input of the logic OR 503 is the RX-bitstream which typically includes changes between logic zero and logic one based on the condition of the bus 105. A logic OR 503 provides, at its output, a logic one if either of its inputs are logic one. Accordingly, with the allow-SOFrecreation being logic zero (which is inverted for the logic OR), the output of the logic OR 503 is a constant logic one. At the logic AND 504, the constant logic one is received at the second input and the TX-bitstream is received at the first input. A logic AND 504 provides a logic one only if both inputs are logic one and a logic zero otherwise. Accordingly, with the constant logic one at its second input, the output of the logic AND is the TX-bitstream. The TX-bitstream is therefore provided to the CAN protocol decoder 303.

If the allow-SOF-recreation is logic one, the input at the second input to the logic OR 503 is logic zero. The input at the first input of the logic OR 503 is the RX-bitstream which typically includes changes between logic zero and logic one based on the condition of the bus 105. A logic OR 503 provides at its output a logic one if either of its inputs are logic one. Accordingly, with the allow-SOF-recreation set to logic one (which is inverted for the logic OR), the output of the logic OR 503 is the RX-bitstream. At the logic AND 504, the RX-bitstream is received at the second input and the TX-bitstream is received at the first input. A logic AND 504 provides a logic one only if both inputs are logic one and a logic zero otherwise. Accordingly, with the idle state or interframe space 407 comprising logic ones (as defined in the CAN standard) and the start-of-frame bit comprising a logic zero (as defined in the CAN standard), as soon as one of the TX-bitstream or RX-bitstream includes a logic zero start-of-frame bit, the output from the logic AND is logic zero and the CAN protocol decoder 303 receives the start-of-frame bit whether that be from the TX-bitstream or the RX-bitstream. The apparatus 304 is configured to change the allow-SOF-recreation signal from logic one to logic zero in response to detection of the start-of-frame logic zero bit 401, 411 by the CAN protocol decoder 303. Accordingly, for the rest of the CAN frame, the CAN protocol decoder 303 receives the TX-bitstream because the allow-SOF-recreation is logic zero.

Figure 6:
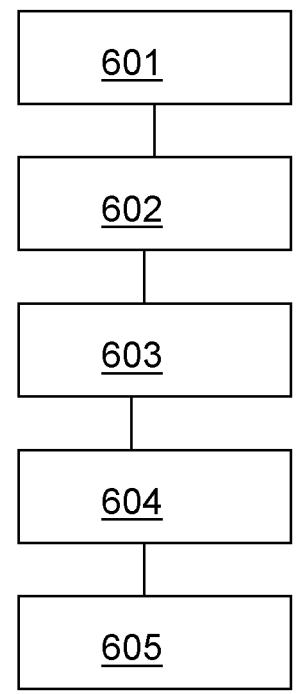
FIG. 6 shows an example method.

FIG. 6 illustrates an example method for mitigation against the TX-bitstream missing a start-of-frame bit comprising:
- receiving 601 an RX-bitstream comprising a bitstream generated from signalling received from a CAN bus by the CAN transceiver for the CAN controller;
- receiving 602 a TX-bitstream comprising a bitstream generated by the CAN controller for receipt by the CAN transceiver for transmission of signalling on the CAN bus;
- receiving 603, by a CAN protocol decoder, a bitstream based on the TX-bitstream for decoding CAN frames therein for monitoring of the CAN controller;
- detecting 604, by circuitry, an idle state that occurs between CAN frames based on the RX-bitstream and the TX-bitstream; and
- based on the detection of the idle state, modifying 605 the bitstream received by the CAN protocol decoder such that it includes a Start-of-Frame bit based on detection of a Start-of-frame bit in the RX-bitstream at least at times when the Start-of-Frame bit is absent in the TX-bitstream.

Figure 7:
FIG. 7 shows a computer readable medium.

FIG. 7 shows a non-transitory computer readable medium comprising computer program code which is configured to cause a processor and a memory to perform the method of FIG. 6.

The instructions and/or flowchart steps in the above figures can be executed in any order, unless a specific order is explicitly stated. Further, two or more of the flowchart steps may be provided in parallel. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus for a controller area network, CAN, node, the node comprising a CAN controller and a CAN transceiver that is configured to couple to a CAN bus, the apparatus comprising a CAN protocol decoder and circuitry, the apparatus configured to:
   - receive an RX-bitstream comprising a bitstream generated from signalling received from the CAN bus by the CAN transceiver for the CAN controller;

receive a TX-bitstream comprising a bitstream generated by the CAN controller for receipt by the CAN transceiver for transmission of signalling on the CAN bus;
wherein the CAN protocol decoder is configured to receive a bitstream based on the TX-bitstream for decoding CAN frames therein for monitoring of the CAN controller; and
wherein the circuitry is configured to:
  detect an idle state that occurs between CAN frames based on at least one of the RX-bitstream and the TX-bitstream;
  based on the detection of the idle state, modify the bitstream received by the CAN protocol decoder such that it includes a Start-of-Frame bit further based on detection of a Start-of-frame bit in the RX-bitstream.

2. The apparatus of claim 1, wherein the circuitry is configured to, based on the detection of the idle state, switch from providing the CAN protocol decoder the TX-bitstream for decoding to providing the CAN protocol decoder with a combination of the RX-bitstream and the TX-bitstream for decoding.

3. The apparatus of claim 1, wherein the circuitry is configured to, based on the detection of the idle state, switch from providing the CAN protocol decoder the TX-bitstream for decoding to providing the CAN protocol decoder with the RX-bitstream rather than the TX-bitstream.

4. The apparatus of claim 1, wherein the circuitry is configured to, based on detection of a dominant bit in said combination of the RX-bitstream and the TX-bitstream, switch to providing the CAN protocol decoder with the TX-bitstream for decoding.

5. The apparatus of claim 1, wherein said circuitry is configured to determine the occurrence of the idle state based on detection of six or more consecutive recessive bits in both the TX-bitstream and the RX-bitstream.

6. The apparatus of claim 1, wherein said apparatus includes a compliance module configured to receive the decoded CAN frame from the CAN protocol decoder, the compliance module configured to determine whether the decoded CAN frame derived from at least the TX-bitstream is compliant with a rule-set based on the CAN protocol and, generate an error signal based on the CAN frames being non-compliant.

7. The apparatus of claim 1, wherein said modification of the bitstream received by the CAN protocol decoder is provided by the circuitry at least at times when the Start-of-Frame bit is absent in the TX-bitstream.

8. The apparatus of claim 6, wherein the rule-set based on the CAN protocol includes one or more specifications of ISO standard 11898-1.

9. The apparatus of claim 1, wherein said CAN protocol decoder comprises a first CAN protocol decoder for decoding CAN frames received, at least in part, in said TX-bitstream, and wherein the apparatus comprises a second CAN protocol decoder configured to decode CAN frames received in said RX-bitstream, wherein the apparatus includes a compliance module configured to compare at least parts of the decoded CAN frames from the first CAN protocol decoder with at least parts of the decoded CAN frames from the second CAN protocol decoder and determine a compliance status of said CAN controller based on a predetermined rule-set and said comparison and generate an error signal based on the CAN frames being non-compliant.

10. The apparatus of claim 1, wherein said CAN protocol decoder is for decoding, at least in part, a combination of the TX-bitstream and RX-bitstream, wherein the apparatus includes a compliance module configured to compare at least parts of the decoded CAN frames from the first CAN protocol decoder with at least parts of the decoded CAN frames from the second CAN protocol decoder and determine a compliance status of said CAN controller based on a predetermined rule-set and said comparison and if the CAN controller is non-compliant, generate an error signal.

11. The apparatus of claim 1, wherein the circuitry is configured to:
  detect a CRC delimiter bit based on the RX-bitstream and the TX-bitstream;
  based on the detection of the CRC delimiter bit modify the bitstream received by the CAN protocol decoder such that it includes an ACK acknowledgement bit based on detection of an ACK acknowledgement bit in the RX-bitstream at least at times when the ACK acknowledgement bit is absent in the TX-bitstream.

12. The apparatus of claim 1, wherein the circuitry is configured to:
  detect a falling edge based on the RX-bitstream, the falling edge for use in time synchronisation; and
  based on the detection of the falling edge, modify the bitstream received by the CAN protocol decoder such that it includes a falling edge at a time corresponding to the time of the detected falling edge in the RX-bitstream, at least at times during an arbitration time.

13. The apparatus of claim 1, wherein said circuitry comprises:
  a logic OR configured to receive the RX-bitstream at a first input and an allow-SOF-recreation signal at a second input, the allow-SOF-recreation signal configured to be logic low based on said detection of the idle state;
  a logic AND configured to receive the TX-bitstream at a first input and an output of the logic OR at a second input; and
  wherein said bitstream received by the CAN protocol decoder comprises an output of said logic AND.

14. The apparatus of claim 1, wherein said apparatus is configured to provide a logic high allow-SOF-recreation signal based on said detection of a dominant bit in a combination of the RX-bitstream and the TX-bitstream at least until detection of a subsequent idle state.

15. The apparatus of claim 1, wherein said apparatus comprises part of the CAN transceiver.

16. The apparatus of claim 1, wherein the circuitry comprises a bit generator for generating a bit in a bitstream and wherein the bit generator is configured to provide a logic zero start-of-frame bit in the TX-bitstream based on the occurrence of a logic zero start-of-frame bit in the RX-bitstream.

17. The apparatus of claim 6, wherein said apparatus is configured to provide for invalidation of a current CAN frame based on said generation of the error signal.

18. The apparatus of claim 1, wherein said CAN protocol decoder is configured to operate in accordance with specifications of ISO standard 11898-1.

19. A method for a controller area network, CAN, node comprising a CAN controller and a CAN transceiver that is configured to couple to a CAN bus, the method comprising:
  receiving an RX-bitstream comprising a bitstream generated from signalling received from a CAN bus by the CAN transceiver for the CAN controller;
  receiving a TX-bitstream comprising a bitstream generated by the CAN controller for receipt by the CAN transceiver for transmission of signalling on the CAN bus;

receiving, by a CAN protocol decoder, a bitstream based on the TX-bitstream for decoding CAN frames therein for monitoring of the CAN controller;

detecting, by circuitry, an idle state that occurs between CAN frames based on the RX-bitstream and the TX-bitstream; and based on the detection of the idle state, modifying the bitstream received by the CAN protocol decoder such that it includes a Start-of-Frame bit based on detection of a Start-of-frame bit in the RX-bitstream.

20. A computer program or computer program product comprising computer program code which is configured to cause a processor and a memory to perform the method of claim 19.

* * * * *